United States Patent
Ballantine et al.

(10) Patent No.: US 7,955,491 B2
(45) Date of Patent: Jun. 7, 2011

(54) METHODS, DEVICES, AND INFRASTRUCTURE SYSTEMS FOR SEPARATING, REMOVING, COMPRESSING, AND GENERATING HYDROGEN

(75) Inventors: Arne W. Ballantine, Round Lake, NY (US); Michael D. Gasda, Albany, NY (US); James F. McElroy, Suffield, CT (US)

(73) Assignee: Honda Motor Co., Ltd., Tokyo (JP)

( * ) Notice: Subject to any disclaimer, the term of this patent is extended or adjusted under 35 U.S.C. 154(b) by 1130 days.

(21) Appl. No.: 10/941,041

(22) Filed: Sep. 14, 2004

(65) Prior Publication Data

US 2006/0054512 A1    Mar. 16, 2006

(51) Int. Cl.
*C25B 1/02*    (2006.01)
*C25B 9/08*    (2006.01)

(52) U.S. Cl. ......................................... 205/637; 204/263
(58) Field of Classification Search .................. 205/637; 204/263
See application file for complete search history.

(56) References Cited

U.S. PATENT DOCUMENTS

| | | | |
|---|---|---|---|
| 3,291,643 A | 12/1966 | Oswin et al. | 136/86 |
| 3,446,674 A | 5/1969 | Giner | 136/86 |
| 3,451,854 A * | 6/1969 | Krostewitz | 429/35 |
| 3,835,019 A | 9/1974 | Lovelock | 204/246 |
| 4,797,185 A | 1/1989 | Polak et al. | 204/129 |
| 5,094,927 A | 3/1992 | Baucke et al. | 429/33 |
| 5,141,604 A * | 8/1992 | Ayers | 205/637 |
| 5,470,669 A | 11/1995 | Ludwig et al. | 429/17 |
| 5,759,712 A | 6/1998 | Hockaday | 429/30 |
| 5,904,754 A | 5/1999 | Juda et al. | 96/11 |
| 6,103,028 A | 8/2000 | Juda et al. | 148/678 |
| 6,168,705 B1 * | 1/2001 | Molter et al. | 205/637 |
| 6,171,574 B1 | 1/2001 | Juda et al. | 423/648.1 |
| 6,238,465 B1 | 5/2001 | Juda et al. | 96/11 |

(Continued)

FOREIGN PATENT DOCUMENTS

DE    196 46 486    5/1998

(Continued)

OTHER PUBLICATIONS

Ballantine, et al., "Fuel Cells and Methods For Generating Electricity," pending U.S. Appl. No. 10/941,044, filed Sep. 14, 2004.

(Continued)

*Primary Examiner* — Alexa D. Neckel
*Assistant Examiner* — Nicholas A. Smith
(74) *Attorney, Agent, or Firm* — Nelson Mullins Riley & Scarborough LLP; Anthony A. Laurentano, Esq.; EuiHoon Lee, Esq.

(57) ABSTRACT

Hydrogen pumps include a proton conducting medium, and a nonporous hydrogen permeable anode electrode and/or nonporous hydrogen permeable cathode electrode. For example, the electrodes may be a solid thin metallic film such as palladium or a palladium alloy such as a palladium-copper alloy that allow for hydrogen permeation but not impurities, and thus, purifying a supply containing hydrogen. The proton conducting medium may be a solid anhydrous proton conducting medium disposed between the anode electrode and the cathode electrode. The anode electrode and the cathode electrode may be directly sealed to at least one of the proton conducting medium, a first member for distributing the supply containing hydrogen to the anode electrode, a second member for collecting a supply of purified hydrogen, and a gasket disposed around the proton conducting medium.

33 Claims, 3 Drawing Sheets

U.S. PATENT DOCUMENTS

| | | |
|---|---|---|
| 6,294,276 B1 | 9/2001 | Ogino .................... 429/17 |
| 6,361,896 B1 | 3/2002 | Eberle et al. .............. 429/40 |
| 6,468,684 B1 | 10/2002 | Chisholm et al. ........... 429/33 |
| 6,488,345 B1 | 12/2002 | Woody et al. ............. 303/152 |
| 6,503,348 B1 | 1/2003 | Poschmann ............... 148/518 |
| 6,627,338 B2 | 9/2003 | St-Pierre et al. ........... 429/13 |
| 6,994,929 B2 * | 2/2006 | Barbir et al. .............. 429/17 |
| 2002/0031695 A1 * | 3/2002 | Smotkin .................. 429/30 |
| 2002/0034670 A1 | 3/2002 | Suenaga et al. ............ 429/30 |
| 2002/0068213 A1 | 6/2002 | Kaiser et al. .............. 429/40 |
| 2003/0104258 A1 | 6/2003 | Haile et al. ............... 429/33 |
| 2003/0170520 A1 * | 9/2003 | Fujii et al. ................ 429/32 |
| 2004/0040862 A1 * | 3/2004 | Kosek et al. .............. 205/637 |
| 2004/0209141 A1 * | 10/2004 | Yamazaki et al. .......... 429/32 |
| 2006/0014068 A1 | 1/2006 | Boysen et al. ............. 429/33 |
| 2006/0054512 A1 | 3/2006 | Ballantine et al. .......... 205/637 |

FOREIGN PATENT DOCUMENTS

| | | |
|---|---|---|
| EP | 0 389 263 | 9/1990 |
| GB | 1092471 | 1/1965 |
| GB | 998097 | 7/1965 |
| WO | 02/11226 | 2/2002 |
| WO | 03/075379 | 9/2003 |

OTHER PUBLICATIONS

Boysen et al., High Performance Solid Acid Fuel Cells Through Humidity Stabilization, Science, Jan. 2004, vol. 303, pp. 68-70, retrieved from www.sciencemag.org.

* cited by examiner fig. 1 fig. 2 fig. 3 fig. 4 fig. 5

METHODS, DEVICES, AND INFRASTRUCTURE SYSTEMS FOR SEPARATING, REMOVING, COMPRESSING, AND GENERATING HYDROGEN

CROSS REFERENCE TO RELATED APPLICATION

This application is related to commonly assigned, co-pending U.S. patent application Ser. No. 10/941,044, filed Nov. 14, 2005, entitled "Fuel Cells And Methods For Generating Electricity."

FIELD OF THE INVENTION

This invention relates generally to hydrogen-based energy system, and more particularly, to methods, devices, and infrastructure systems for separating, removing, compressing, and generating hydrogen.

BACKGROUND OF THE INVENTION

Hydrogen is an important zero emission fuel. Recently, development of hydrogen fuel infrastructure systems has become a priority to support the use of hydrogen as a fuel.

An important part of a hydrogen fuel infrastructure system is generation of hydrogen. Two methods are generally used for generating hydrogen. One method includes a reforming process for generating hydrogen, e.g., converting hydrocarbon fuel such as natural gas or propane into a hydrogen-rich gas. Another method includes an electrolysis process which uses electrical energy to split water molecules into hydrogen and oxygen. With either method, the hydrogen is often purified and/or compressed so that it can be stored for use.

Hydrogen pumps having proton exchange membranes with porous electrodes have been used for hydrogen purification and/or compression of hydrogen rich gas. Hydrogen separation has also been accomplished via diffusion of hydrogen through a palladium-copper or other palladium alloy foils. In addition, pressure swing absorbers and mechanical compressors have been used to produce high purity pressurized hydrogen.

There is a need for further improvements in hydrogen fuel infrastructure systems, and in particular, to methods, devices, and infrastructure systems for separating, removing, compressing, and generating hydrogen.

SUMMARY OF THE INVENTION

The present invention provides in a first aspect, devices for at least one of separating, removing, compressing, and generating hydrogen. The devices include an anode electrode, a cathode electrode, a first member for distributing a supply containing hydrogen to the anode electrode from an anode inlet, a second member for collecting a supply of hydrogen separated from the supply containing hydrogen from the cathode electrode, a solid anhydrous proton conducting medium disposed between the anode electrode and the cathode electrode, and wherein at least one of the anode electrode and the cathode electrode comprises a nonporous hydrogen permeable electrode.

The present invention provides in a second aspect, devices for at least one of separating, removing, compressing, and generating hydrogen. The devices include an anode electrode, a cathode electrode, a first member for distributing a supply containing hydrogen to the anode electrode from an anode inlet, a second member for collecting a supply of hydrogen separated from the supply containing hydrogen from the cathode electrode, a proton conducting medium disposed between the anode electrode and the cathode electrode, the anode electrode and/or the cathode electrode comprising a nonporous hydrogen permeable electrode, and wherein the nonporous hydrogen permeable electrode is directly sealed to at least one of a) the proton conducting medium, b) the first member, c) the second member, and d) a gasket disposed around the proton conducting medium.

The present invention provides in a third aspect, hydrogen fuel infrastructure systems which include the above-mentioned devices, a storage tank for storing purified hydrogen from the devices, and a reformer for supplying reformate to the devices.

The present invention provides in a fourth aspect, methods for at least one of separating, removing, compressing, and generating hydrogen. The methods include providing a supply containing hydrogen to the above-mentioned devices, applying an electrical potential to the anode electrode and the cathode electrode, transferring protons through the proton conducting medium from the anode electrode to the cathode electrode, and exhausting at least a portion of the supply to the anode inlet.

The present invention provides in a fifth aspect, methods for forming a hydrogen pump which includes providing a proton conducting medium, positioning the proton conducting medium between the anode electrode and the cathode electrode, at least one of the anode electrode and the cathode electrode comprising a nonporous hydrogen permeable electrode, disposing the anode electrode and the cathode electrode between a first member for distributing a supply containing hydrogen to the anode electrode from an anode inlet, and a second member for collecting a supply of hydrogen separated from the supply containing hydrogen from the cathode electrode, and wherein at least one of the positioning and the disposing comprises directly sealing the at least one nonporous hydrogen permeable electrode to at least one of a) the proton conducting medium, b) the first member, c) the second member, and d) a gasket disposed around the proton conducting medium.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and accompanying drawings in which:

DETAILED DESCRIPTION OF THE INVENTION

Figure 1:
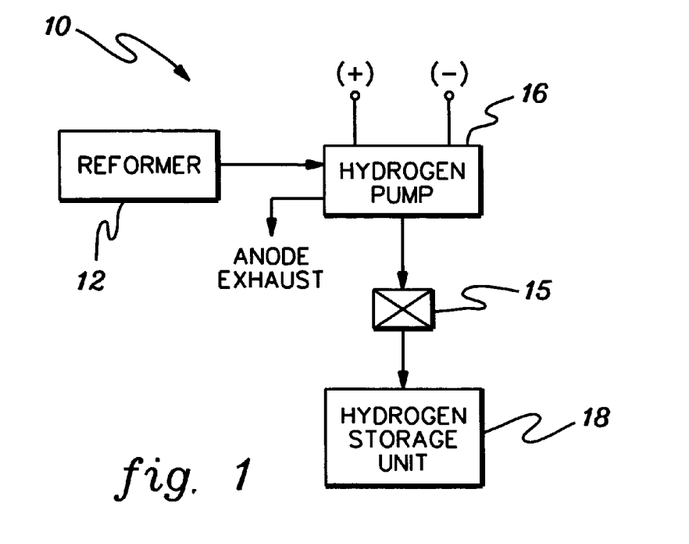
FIG. 1 is a diagrammatic illustration of a hydrogen infrastructure system in accordance with the present invention.

FIG. 1 is an example of one embodiment of a hydrogen infrastructure system 10 in accordance with the present invention which may include a reformer 12 such as a catalytic partial oxidation (CPO) reformer, a steam reformer, or an autothermal reformer for converting a hydrocarbon such as methane or methanol into a hydrogen-rich stream, a hydrogen pump 16 as described in greater detail below, and a hydrogen storage unit 18.

The various embodiments of the hydrogen pump of the present invention may employ a solid anhydrous proton conducting medium (e.g., not having water), and a nonporous hydrogen permeable anode electrode and/or nonporous hydrogen permeable cathode electrode comprising, for example, palladium, a palladium alloy such as a palladium-copper alloy, or other material which allows for hydrogen permeation.

Other embodiments of the hydrogen pump of the present invention may employ a proton conducting medium disposed between the anode electrode and the cathode electrode wherein at least one of the anode electrode and the cathode electrode comprises a nonporous hydrogen permeable electrode, and wherein the at least one nonporous hydrogen permeable electrode is directly sealed to at least one of the proton conducting medium, a first member for distributing a supply containing hydrogen to the anode electrode, a second member for collecting a supply of purified hydrogen, and a gasket disposed around the proton conducting medium. This provides the advantage of sealing and reducing leakage and/or providing a rigid support for the proton conducting medium.

The various embodiments are capable of efficiently separating, compressing, and generating hydrogen. In addition, the various embodiments of the present invention overcome the problem with conventional hydrogen pumps which allow impurities such as nitrogen, argon, carbon dioxide, and carbon monoxide to enter the product gas stream. In addition, while the discussion below generally describes purifying hydrogen from an impure hydrogen stream, the present invention may also allow for removing hydrogen from a stream that is "polluted" with hydrogen. For example, in space applications or other applications where a supply of extremely pure methane is required, the hydrogen pump of the present invention may be operated to extract hydrogen which is a common pollutant in methane.

Figure 2:
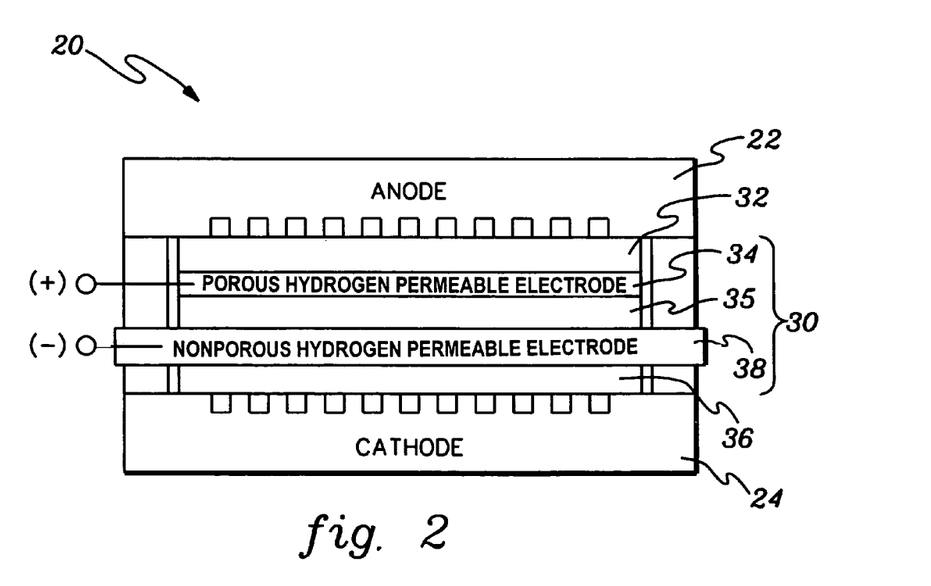
FIG. 2 is a cross-sectional view of one embodiment of a hydrogen pump which includes a nonporous hydrogen permeable cathode electrode in accordance with the present invention for use in FIG. 1.

FIG. 2 illustrates one embodiment of a hydrogen pump 20 in accordance with the present invention for use, for example, in the hydrogen pump shown in FIG. 1. In this embodiment, as explained in greater detail below, the hydrogen pump includes a proton conducting electrochemical cell having a nonporous hydrogen permeable cathode electrode.

For example, hydrogen pump 20 is operable for separating, removing, and/or compressing pure hydrogen from an input supply containing hydrogen such as reformate. Hydrogen pump 20 may include an anode separator plate or member 22 attached to an anode inlet for receiving the supply containing hydrogen and having flow channels for distributing the supply containing hydrogen, a cathode separator plate or member 24 having flow channels for collecting and exhausting purified hydrogen to a cathode outlet, and a proton conducting electrochemical cell 30 sandwiched between the anode separator plate 22 and cathode separate plate 24.

Proton conducting electrochemical cell 30 may include an anode gas diffusion layer 32 and an anode electrode 34 disposed adjacent to anode separator plate 22, a cathode gas diffusion layer 36 and a cathode electrode 38 disposed adjacent to the cathode separator plate 24, and a proton conducting medium 35 disposed between anode electrode 34 and cathode electrode 38.

Anode electrode 34 may comprise a conventional porous electrode formed from palladium having a plurality of pathways or pores through which the hydrogen gas and impurities may readily pass. For example, the conventional anode electrode may also comprise platinum or a platinum-ruthenium alloy catalyst layer.

Cathode electrode 38 may include a nonporous hydrogen permeable electrode such as a solid thin metallic film. The solid thin film may include palladium or an alloy comprising palladium such as a palladium-copper alloy, e.g., 60% Cu/40% Pd (atomic percent). The solid thin film electrode may have a thickness less than about 25 microns, and desirably a thickness less than about 10 microns.

In one aspect of the present invention, the proton conducting medium 35 may include solid anhydrous (e.g., not having water) proton conducting mediums, for example, solid state conductors such as inorganic and ceramic based systems, perovskite ceramics, solid-acids such as cesium dihydrogen phosphate ($CsH_2PO_4$), or other suitable solid anhydrous proton conducting mediums.

In other aspects of the invention, the proton conducting medium 35 may include a proton exchange membrane (PEM) such as a NAFION perfluorosulfonic acid polymer membrane (available from E. I. DuPont de Nemours and Co., Wilmington, Del., USA), a polybenzimidazole (PBI) polymer membrane, a polyetheretherketones (PEEK), sulfonated polysulfones, a polyimide, a hydrocarbon membrane, a polytrifluoro-styrenesulfonic acid, variations of perfluorosulfonic acid membranes, other polymeric or non-polymeric proton conductors including any strong acids.

When the proton conducting electrochemical cell is operated in a hydrogen pumping mode, an input supply containing hydrogen is supplied to the anode side and a voltage potential is applied to the electrodes to cause proton pumping across the proton conducting medium. Hydrogen moves from a hydrogen rich input stream to the porous hydrogen permeable anode electrode where the hydrogen gas forms protons (H+) and electrons. It is believed that the protons are then driven across the proton conducting medium and conducted through the nonporous hydrogen permeable cathode electrode. Molecular hydrogen is then generated in a pure, dry form on the cathode side, i.e., the output side of the nonporous hydrogen permeable electrode.

For applications of purifying or generating pure hydrogen, the input supply containing hydrogen and/or the build up of impurities (e.g., CO, N2, etc. and O2 in the case of when operated as an electrolyzer) in the anode inlet may be exhausted as shown in FIG. 1. For example, this may include deadheading the anode (e.g., no anode exhaust), periodically exhausting the anode inlet of impurities, continually or periodically bleeding the anode inlet, recirculating exhaust, and/or purging exhaust into the atmosphere or into a tank. A valve may be employed for controlling the exhaust from the anode inlet.

Figure 3:
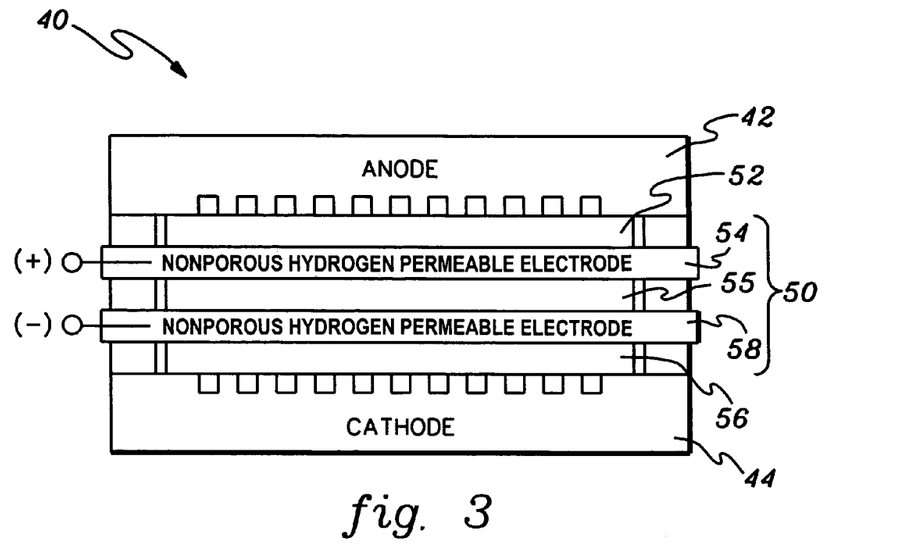
FIG. 3 is a cross-sectional view of another embodiment of a hydrogen pump which includes a nonporous hydrogen permeable anode electrode and a nonporous hydrogen permeable cathode electrode in accordance with the present invention for use in FIG. 1.

FIG. 3 illustrates another embodiment of a hydrogen pump 40 in accordance with the present invention for use, for example, in the hydrogen pump shown in FIG. 1. In this embodiment, as explained in greater detail below, the hydrogen pump includes a proton conducting electrochemical cell having a nonporous hydrogen permeable anode electrode and a nonporous hydrogen permeable cathode electrode.

For example, hydrogen pump 40 is operable for separating, removing, and/or compressing pure hydrogen from an input supply containing hydrogen such as reformate. Hydrogen pump 40 may include an anode separator plate or member 42 connected to an anode inlet and having flow channels for distributing the supply containing hydrogen, a cathode separator plate or member 44 having flow channels collecting and exhausting purified hydrogen to a cathode outlet, and a proton conducting electrochemical cell 50 sandwiched between anode separator 42 and cathode separator plate 44.

Proton conducting electrochemical cell 50 may include an anode gas diffusion layer 52 and an anode electrode 54 disposed adjacent to anode separator plate 42, a cathode gas diffusion layer 56 and a cathode electrode 58 disposed adjacent to the cathode separator plate 44, and a proton conducting medium 55 disposed between anode electrode 54 and cathode electrode 58. Anode electrode 54 may comprises a nonporous hydrogen permeable electrode and cathode electrode 58 may comprise a nonporous hydrogen permeable electrode.

Both the nonporous hydrogen permeable anode electrode 54 and the nonporous hydrogen permeable cathode electrode 58 may comprise a solid thin metallic film. The solid thin film may include palladium or an alloy comprising palladium such as a palladium-copper alloy, e.g., 60% Cu/40% Pd (atomic percent). The solid thin may have a thickness less than about 25 microns, and desirably a thickness less than about 10 microns.

The proton conducting medium 55 may include the solid anhydrous proton conducting mediums, and/or other proton conducting mediums as described above in connection with the proton conducting medium in FIG. 2.

When proton conducting electrochemical cell 50 is operated in a hydrogen pumping mode, an input supply containing hydrogen is supplied to the anode side and a voltage potential is applied to the electrodes to cause proton pumping across the proton conducting medium. Essentially pure hydrogen passes through the nonporous hydrogen permeable anode electrode, thereby blocking impurities from passing into the proton conducting medium. In addition, where the proton conducting medium includes water and other constituents, the water or other constituents in the proton conducting medium will not be allowed to exit the proton conducting medium through back-diffusion, or through carry-over into the product stream or out the inlet since again, essentially just pure hydrogen can pass through the nonporous hydrogen permeable electrodes. Thus, water in the proton conducting medium in the case of a PEM (or acid, in the case of PBI PEM) will be encapsulated causing the PEM to be stable at temperatures higher than normal. As described above, a portion of the supply containing hydrogen and/or the build up of impurities (e.g., CO, N2, etc.) in the anode inlet may be exhausted.

Figure 4:
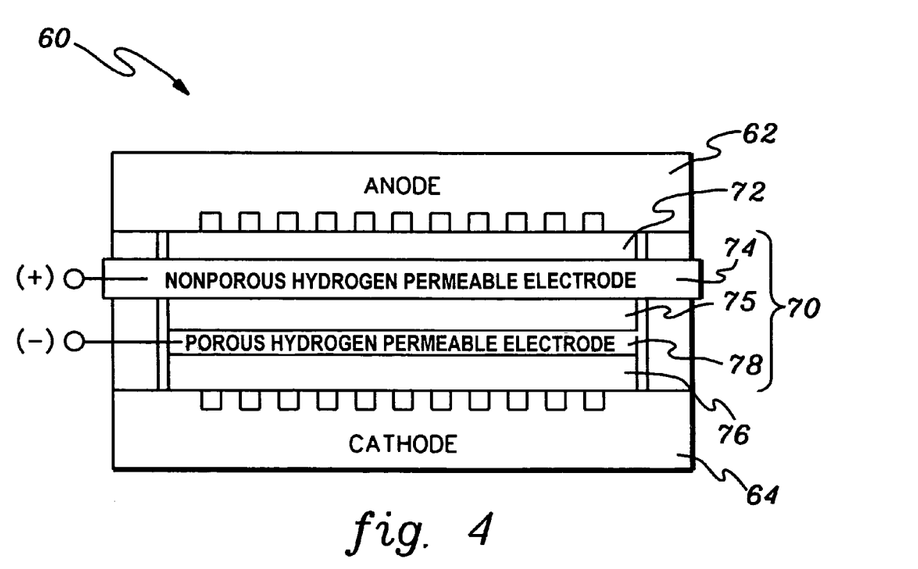
FIG. 4 is a cross-sectional view of another embodiment of a hydrogen pump which includes a nonporous hydrogen permeable anode electrode in accordance with the present invention for use in FIG. 1.

FIG. 4 illustrates another embodiment of a hydrogen pump 60 in accordance with the present invention for use, for example, in the hydrogen pump shown in FIG. 1. In this embodiment, as explained in more detail below, the hydrogen pump includes a proton conducting electrochemical cell having a nonporous hydrogen permeable anode electrode.

For example, hydrogen pump 60 is operable for separating, removing, and/or compressing pure hydrogen from an input supply containing hydrogen such as reformate. Hydrogen pump 60 may include an anode separator plate or member 62 attached to an anode inlet for receiving the supply containing hydrogen and having flow channels for distributing the supply containing hydrogen, a cathode separator plate or member 64 having flow channels for collecting and exhausting purified hydrogen to a cathode outlet, and a proton conducting electrochemical cell 70 sandwiched between the anode separator plate 62 and cathode separate plate 64.

Proton conducting electrochemical cell 70 may include an anode gas diffusion layer 72 and an anode electrode 74 disposed adjacent to anode separator plate 62, a cathode gas diffusion layer 76 and a cathode electrode 78 disposed adjacent to the cathode separator plate 64, and a proton conducting medium 75 disposed between anode electrode 74 and cathode electrode 78. Anode electrode 74 may comprises a nonporous hydrogen permeable electrode and cathode electrode 78 may comprise a porous electrode.

Nonporous hydrogen permeable anode electrode 74 may comprises a solid thin metallic film. The solid thin film may include palladium or an alloy comprising palladium such as a palladium-copper alloy, e.g., 60% Cu/40% Pd (atomic percent). The solid thin may have a thickness less than about 25 microns, and desirably a thickness less than about 10 microns.

Cathode electrode 78 may comprise a conventional porous electrode formed from palladium having a plurality of pathways or pores. For example, the conventional anode electrode may also comprise platinum or a platinum-ruthenium alloy catalyst layer.

The proton conducting medium 75 may include the solid anhydrous proton conducting mediums, and/or other proton conducting mediums as described above in connection with the proton conducting medium in FIG. 2.

When proton conducting electrochemical cell 70 is operated in a hydrogen pumping mode, an input supply containing hydrogen is supplied to the anode side and a voltage potential is applied to the electrodes to cause proton pumping across the proton conducting medium. Essentially pure hydrogen passes through the nonporous hydrogen permeable anode electrode, thereby blocking impurities from passing into the proton conducting medium. As described above, a portion of the supply containing hydrogen and/or the build up of impurities (e.g., CO, N2, etc.) in the anode inlet may be exhausted.

Another aspect of the present invention includes directly sealing the anode electrode or cathode electrode to the proton conducting medium, the anode separator plate or member, the cathode separator or member, and/or a gasket disposed around the proton conducting medium.

For example, in the various embodiments the nonporous hydrogen permeable anode electrode and/or the nonporous hydrogen permeable cathode electrode may be bonded (e.g., by diffusion bonding, welding, vapor deposition, and sputtering) to the anode or cathode separator plate or member. In the case of the cathode, this provides the advantage of sealing in the cathode, high-pressure volume making leakage very small and providing rigid support for the proton conducting medium such as a PEM electrolyte.

The surface of the nonporous hydrogen permeable electrode may also be assembled to create a high contact surface area between the proton conducting medium and the nonporous hydrogen permeable electrode. Such a process may be utilized to maximize the conduction of hydrogen from, for example, a PEM to the nonporous hydrogen permeable electrode. Methods such as physical vapor deposition (PVD) of nonporous hydrogen permeable electrode film material may be employed to create a continuous, but highly conformal layer of material are possible. In such a case, the PVD process may be conducted to deposit the nonporous hydrogen permeable electrode layer directly upon the PEM layer. Other processes, such as low-temperature chemical vapor deposition (CVD) or plasma-enhanced chemical vapor deposition (PECVD) processes may also be possible. Further, processes such as chemical mechanical polishing (CMP), or mechanical scoring of the nonporous hydrogen permeable electrode surface may be possible. Methods of direct bonding of PEM films to nonporous hydrogen permeable electrode films may also be utilized.

Figure 5:
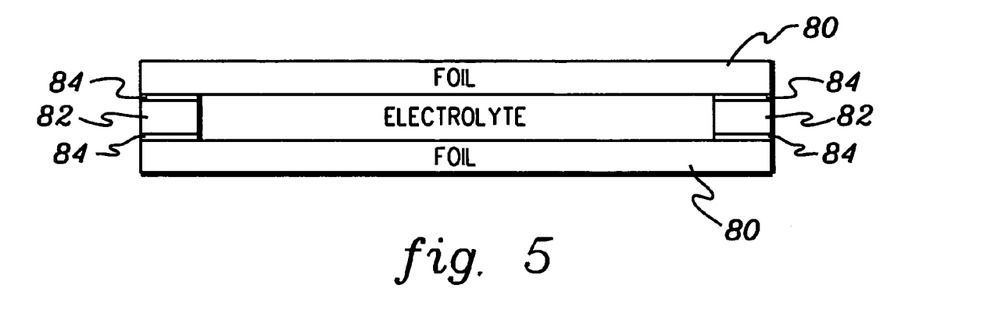
FIG. 5 is a cross-sectional view of a seal formed between two nonporous hydrogen permeable electrodes in accordance with the present invention.

FIG. 5 illustrates one embodiment of a seal formed between two palladium foils 80 for keeping the electrolyte in place. For example, the seal or gasket may be formed using a metallized ceramic 82 which in turn can be diffusion bonded to the palladium foils with a layer of copper 84. In addition, because of the composition of the metallized ceramic, diffusion bonding can take place at the same time the palladium foils are bonded to the end plates. Specifically, a ceramic such as silicon carbide, silicon nitride, aluminum nitride, or a member of a number of ceramics, especially non-oxide ceramics, can be metallized with a multitude of metals, in particular copper. Copper is advantageous in that it will bond to the palladium foil in a similar manner as that of the copper clad end plates.

It is also desirable to maintain a good electrolyte seal, if the electrolyte dehydrates or is otherwise allowed to decompose or leak, cell performance may be diminished. Accordingly, the hydration level may be optimized before sealing in the electrolyte between the nonporous hydrogen permeable electrodes. Additionally, a metallized ceramic gasket may be used, such that the ceramic acts as the dielectric maintaining applied voltage across the cell, and the Pd-alloy nonporous hydrogen permeable electrode is diffusion bonded or welded to the gasket. A hermetic seal is thereby created, and the electrolyte can operate under high pressure without losing seal integrity.

Due to corrosion issues, the nonporous hydrogen permeable electrode and the acid electrolyte may be chosen with care, especially in the case of liquid acid or alkaline electrolytes. The electrode spans a range of electrochemical potentials during normal operation, and the pH will vary as well. Therefore the electrode should be stable throughout the entire resulting area on its Pourbaix diagram. Palladium copper has the advantage of swelling minimally in the presence of hydrogen, and therefore has been shown to have longer usable lifetime, especially through many thermal cycles. Acid electrolytes such as manganic acid, (per)rhenic acid, telluric acid, and technetic acid, may be suitable with PdCu, PdAg, and PdHo.

In the embodiments where the anode electrode comprises a porous electrode and the cathode electrode comprises a nonporous hydrogen permeable electrode, because the palladium cathode electrode allows hydrogen to pass, the cell operated in these modes has the advantages of holding the fluids contained within the proton conducting medium, i.e., the fluids are not allowed to exit the cell as a portion of the product stream.

Additional features of the present invention may include the outer or inner sides (or both sides) of the nonporous hydrogen permeable anode and/or cathode electrodes being coated with platinum, a platinum-ruthenium alloy, palladium, rhodium, noble metals, or other efficient hydrogen reaction catalysts. The layers of compressible conductive material such as gas diffusion media may be introduced between the anode inlet or separator plate and the cathode outlet or separator plate and the proton conducting medium to provide good electrical contact.

When small levels of carbon monoxide are present in the impure hydrogen input stream, the platinum-ruthenium anode catalyst will oxidize the carbon monoxide. Use of air injection of some small concentration may be utilized as well, or the cell temperature may be elevated so that carbon monoxide poisoning is negligible.

In the embodiments where the anode electrode comprises a porous electrode and when a NAFION proton conducting medium is used, input humidity levels may be selected to balance cell performance. For example, since all water must enter and exit the cell via anode inlet and outlet, the cell performance may be optimum when input anode relative humidity (RH) level is less than 100-percent. The advantages of a sealed electrolyte are also apparent with solid-acid electrolytes. Although the proton transport mechanism is anhydrous, these electrodes may still dehydrate. The use of nonporous hydrogen permeable anode and cathode electrodes overcomes this limitation.

In the embodiments where the anode electrode comprises a nonporous hydrogen permeable electrodes (and where the cathode electrode comprises a porous electrode) and where a NAFION proton conducting medium is used, humidification of the electrolyte is alleviated because the necessary water is already present in the membrane material and trapped within the two non porous hydrogen permeable electrodes. In the embodiments where the anode and cathode electrodes comprise nonporous hydrogen permeable electrodes and because the nonporous hydrogen permeable electrodes will prevent water loss from, for example, a NAFION PEM while simultaneously preventing the entry of contaminants, the cell of the invention may be operated at higher temperatures than typically possible with NAFION. Higher equivalent weights of NAFION can also be chosen.

In the embodiments where the anode electrode comprises a porous hydrogen electrode and when a polybenzimidazole (PBI) membrane is used, the cell may be operated at a higher temperature compared to using a NAFION membrane. The nonporous hydrogen permeable cathode electrode acts to prevent evaporative acid loss to the cathode side. Because of the high operating temperature, a polybenzimidazole (PBI) membrane cell will have the advantage of tolerance of high levels of carbon monoxide at the cell anode.

In addition, the various embodiments of the present invention employing a nonporous hydrogen anode electrode and porous cathode, for example, with NAFION as the proton conducting medium, overcome the problem of conventional hydrogen pumps, which produce a product gas stream which is saturated with water at the cell operating temperature.

A non-oxide ceramic may be used in that it is stable in oxidizing and reducing environments, stable in such environments at elevated temperatures (about 1000+ degree Celsius), has a low to zero porosity in fully dense ceramics, exhibit excellent electrical insulator characteristics, and lastly, can be metallized. Methods to metallize ceramic forms are well known and used in the electronics industry on a regular basis in multilayer packages. The sealing material bonds the two foils while at the same time maintaining its electrical insulation character. The sealing mechanism is desirably selected to hold up to the chemical environment as well as the temperatures of the operating cell.

A problem with nonporous hydrogen permeable electrodes for use in hydrogen pumps is corrosion, especially the palladium copper foil which is likely under the hot, high pressure, inside the electrolyte. However, there may be advantages to using incompatible materials for their distinct individual advantages under certain conditions.

Various approaches are proposed which include applying a coating to one or more of the material surfaces, separating or isolating them, and/or treating either or both materials in any other way (e.g., doping, limiting the mass transport of corrosion reaction), in order to enhance the usable lifetime and/or performance of the materials in the context of an electrochemical hydrogen purifier/compressor.

Possible approaches include, for example, the following:

(1) When using bare (uncoated) nonporous hydrogen permeable electrodes, the electrolyte and Pd-alloy may be chosen such that the system is resistant to corrosion throughout the operating space in the Pourbaix diagram for the system.

(2) A layer of porous, catalytically active material such as platinum, palladium, rhodium, or other catalysts may be sputtered onto the surface of one or both nonporous hydrogen permeable electrodes, or applied in some other manner (e.g., PTFE-bonded), such that sufficient electrode area remains to carry out the reaction.

(3) For solid-state proton conductors, the surface of one or both nonporous hydrogen permeable electrodes may be sealed with such material as perovskite ceramic, or solid acid material.

(4) For solid-state proton and electron conductor, similar to (3) above, except the proton conductor is doped with metal to make it electrically conductive as well. A Pd-foil also satisfies these attributes.

(5) For a shorted cell, similar to (4) above, except catalyzed. This is effectively an internally shorted fuel cell/hydrogen pump cell.

(6) Hermetic seal using an electroplated catalyst (e.g., electroplated Pt), similar to (1) above, except non-hydrogen porous. This layer would presumably be quite thin.

(7) For a solid-state, porous proton and electron conductor, similar to (4) above, expect porous.

(8) For an electrode layer (e.g., supported precious metal catalyst with either good "acid management", or ionomerized), an electrode may be a hydrogen-permeable, catalytically active layer that is electrically and protonically conductive.

(9) For an oxide layer, the layer may be deposited onto the foil. This layer may not necessarily be highly permeable to hydrogen, in which case it must be very thin. Suitable oxides include oxides of tantalum, niobium, vanadium, aluminum, as they readily oxidize in air.

It is also noted that the method, treatment, isolation, or coating of the interface between the electrolyte and a nonporous hydrogen permeable electrode, within an electrochemical system whose purpose is to purify and/or compress hydrogen, may affect hydrogen gas permeability, proton conductor permeability, electron conductor permeability, and whether catalytically active to hydrogen.

The cells may be fabricated using methods employing semiconductor fabrication techniques. For example, a relatively large silicon wafer can be etched with small holes for gas diffusion. A very thin layer (about 100 nm) of palladium can be sputtered onto this structure, and an alloy can be fabricated by co-sputtering its constituents. An optional insulting layer can be applied to prevent shorting against the bottom (cathode) Pd-layer. The electrolyte can be similarly co-sputtered, or applied manually. A final layer of Pd-alloy can applied (where both a nonporous hydrogen permeable anode and cathode electrodes are employed), or simply a catalyzed gas diffusion layer can be applied (where a nonporous hydrogen permeable anode electrode is employed). Current collection from the cathode can be accomplished in a variety of ways, such as edge collection, metal traces through the silicon, or other ways and combinations thereof.

The present invention may be practiced on a wafer-scale embodiment. Such an embodiment would possess the advantage of small size, hundreds of nanometers thick, or even thinner. A very thin electrolyte layer would decrease the power required to pump hydrogen at a constant rate. A shorter ionic conduction distance means diminished DC iR losses. In addition, thinner layers may potentially decrease the bulk material costs of a device in mass production.

The device can be constructed using fabrication techniques that may be quite similar to those employed in the semiconductor industry. One such method of fabrication of a wafer-scale hydrogen pump is proposed below while other methods may be suitable as well.

Beginning with a silicon wafer substrate (or other convenient substrate piece), the wafer is patterned via use of photo-resist, lithography and etched using plasma "RIE" etch to create trenches for passing hydrogen through the substrate. Following this etch processing the photo-resist is then stripped. The trenches may either create holes all the way through the substrate, or the back-side of the substrate may be subsequently thinned where hydrogen passing through is desired such that the holes are exposed to the back-side in the active region.

A conductive path from the front side of the wafer to the back side of the wafer is created. This may be done by heavily doping the Si substrate with P (boron) or N (phosphorous) dopant. This may also be done by coating the trench holes with a conductive material such as a thin conformally deposited layer of Ag, Au, heavily doped Si, or other conductive material. This may also be done by creating additional trenches which will be etched, deposited full of conductor, and polished flat using chemical-mechanical polishing or other such means. If this latter is used, then the processing step to create conductive vias should be carried out prior the wafer being patterned as noted above.

Processing on the backside of the substrate includes a layer of Pd-alloy being sputtered on the backside of the wafer. If it is desired to end-point the etch of the trench-etch steps or by etch-stop with the Pd layer, then this step should be carried out prior thereto. To create the structure of embodiment as shown in FIG. 3, at this point in the processing three layers should be deposited, an anode Pd alloy layer, an electrolyte layer, and a cathode electrolyte layer.

The edges of the Pd layer are then selectively removed. The center region of the wafer Pd layer is protected using photo resist and lithography. The edges of the wafer are etched to remove Pd in that region using plasma or wet etch. Thereafter, the photo resist is removed.

A dielectric spacer is then deposited on the edge of the wafer such as an insulating material such as SiO2, $Si_xN_y$ (silicon nitride of sufficient stoichiometry to provide good insulation), ZrO2, or other such material. The edge region is protected using photo resist and lithography. The insulator is etched away in the center region using plasma or wet etch. The end-point of the edge is when the Pd layer is reached. The photo resist is then removed.

The electrode layer is then deposited and etched-back. This includes, protecting the center region using photo resist and lithography, using wet or plasma etch to remove the edge portion of these films, and removing the photo resist.

The present invention results in attaining high purity hydrogen, on a wet basis. For example, conventional NAFION PEM compressors utilizing NAFION 1035 electrolyte have been measured to yield 99.2% pure H2 on a dry basis, but fully saturated at the operating temperature of 65-degrees Celsius, necessitating a subsequent drying step; even then, further purification is necessary in order to achieve the target purity of 99.99%. Compressors utilizing PdCu nonporous hydrogen permeable electrodes yield a hydrogen purity of 99.999% or 99.9999% on a wet basis (no further drying necessary), because palladium alloys will not diffuse gases other than hydrogen.

High pH electrolytes can be difficult to manage in which OH— is charge carrier. For example, the conductivity of the electrolyte is quite high, but this conductivity is a strong function of the water content. This is because of the OH— charge carrier in which water is split at the cathode, and created at the anode. There must be plenty of water available at the cathode to support to the reaction. For example, because PdCu needs to be hot in order to permeate hydrogen (H2), these electrolytes consequently have high vapor pressures. As noted above, the proposed double nonporous hydrogen permeable electrode hydrogen pump, diffusion-bonded to a ceramic gasket, can maintain much higher electrolyte pressures. In addition, the nonporous hydrogen permeable electrode prevents dehydration of a PEM layer.

A PEM or solid-acid electrolyte may not require nonporous hydrogen permeable electrode protection on both sides, since it is solid-state, but this embodiment may be desired for other reasons. For example, the solid acid electrolyte must be protected from liquid water or else it may be dissolved, which could happen in, for example, a cooldown or dormant state. In addition, a cesium dihydrogen phosphate electrolyte, even more than its other solid-acid counterparts (sulfate-, selenate-based acids, e.g.), is particularly vulnerable to dehydration. Even though water is not mobile within this electrolyte, it is necessary to maintain some level of hydration to prevent the material from decomposing at that temperature. It has been shown that the phosphate solid-acid can be kept sufficiently hydrated up to operating temperatures of about 270-degrees Celsius, if a partial pressure of water of about 0.30 atm is maintained (equivalent to a 70-degrees Celsius dewpoint at atmospheric pressure). This pressure is easily maintained within the electrolyte if sealed between nonporous hydrogen permeable electrodes such as PdCu alloy, as compared to thousands of psi if a liquid/water electrolyte is used.

In other aspects of the present invention, the proton conducting electrochemical cells of the present invention may be formed as a flat cell (where the cell has a generally flat shape with top and bottom) or in a tubular shape. The palladium foil example of the molecular sieve material (i.e., electrode) has the advantage that it can be bonded directly to a support, or be used as the support structure itself, e.g., act as a member for distributing or collecting gases, such that a very large differential pressure can be generated and very high pressures achieved.

The present invention may be configured as fuel cells for generating electricity as described in concurrently filed U.S. patent application Ser. No. 10/941,044, entitled "Fuel Cells And Methods For Generating Electricity", which is hereby incorporated by reference herein in its entirety. For example, an anode inlet may be provided for receiving a fuel and a cathode inlet may be provided for receiving an oxidant.

The above-described proton conducting electrochemical cells can also be operated as an electrolyzer where water is introduced to the anode side and split so that hydrogen is evolved on the cathode side.

The above-described hydrogen pumps, fuel cells, and proton conducting electrochemical cells in accordance with the present invention may also incorporate additional features. For example, the various embodiments may include a stack or a plurality of proton conducting electrochemical cells, e.g., a matrix of small active area cells run in parallel.

While various embodiments of the present invention have been illustrated and described, it will be appreciated by those skilled in the art that many further changes and modifications may be made thereunto without departing from the spirit and scope of the invention.

The invention claimed is:

1. A method for at least one of separating, removing, compressing, and generating hydrogen, the method comprising:
   providing a supply containing hydrogen to a device comprising:
   an anode electrode;
   a cathode electrode;
   a first member having a surface with at least one flow channel thereon for distributing the supply containing hydrogen to a first side of the anode electrode from an anode inlet;
   a second member having a surface with at least one flow channel thereon for collecting a supply of purified hydrogen separated from the supply containing hydrogen from a first side of the cathode electrode;
   a solid anhydrous proton conducting electrolyte disposed between a second side of the anode electrode and a second side of the cathode electrode; and
   wherein at least one of the anode electrode and the cathode electrode comprises a nonporous hydrogen permeable electrode comprising a solid thin metallic film,
   wherein the at least one nonporous hydrogen permeable electrode comprising the solid thin metallic film is bonded to at least one of a) the proton conducting electrolyte, and b) a gasket disposed around the proton conducting electrolyte,
   wherein the nonporous hydrogen permeable electrode protrudes beyond the gasket in an extending direction thereof;
   applying an electrical potential to the anode electrode and the cathode electrode;
   transferring protons through the solid anhydrous proton conducting electrolyte from the anode electrode to the cathode electrode;
   exhausting at least a portion of the supply to the anode inlet; and
   collecting purified hydrogen via the second member.

2. The method of claim 1 wherein the at least one nonporous hydrogen permeable electrode is bonded to the gasket disposed around the proton conducting electrolyte.

3. The method of claim 1 wherein the at least one nonporous hydrogen permeable electrode is bonded to the proton conducting electrolyte by vapor deposition.

4. The method of claim 1 wherein the transferring protons comprises transferring protons through the solid anhydrous proton conducting electrolyte selected from the group comprising a perovskite ceramic and a solid acid proton conducting electrolyte.

5. The method of claim 1 wherein the transferring protons comprises transferring protons through the solid anhydrous proton conducting electrolyte comprising cesium dihydrogen phosphate.

6. The method of claim 1 wherein the anode electrode comprises the nonporous hydrogen permeable electrode comprising the solid thin metallic film.

7. The method of claim 1 wherein the cathode electrode comprises the nonporous hydrogen permeable electrode comprising the solid thin metallic film.

8. The method of claim 1 wherein the anode electrode and the cathode electrode comprise nonporous hydrogen permeable electrodes comprising the solid thin metallic film.

9. The method of claim 1 wherein the solid thin film comprises palladium.

10. The method of claim 1 wherein the providing the supply containing hydrogen comprises a mixture of gas having hydrogen.

11. The method of claim 1 wherein the providing the supply containing hydrogen comprises providing a supply of water.

12. The method of claim 1 further comprising applying backpressure to the cathode outlet.

13. The method of claim 1 wherein the device comprises a stack.

14. A method for at least one of separating, removing, compressing, and generating hydrogen, the method comprising:
provoiding a supply containing hydrogen to a device comprising:
an anode electrode;
a cathode electrode;
a first member having a surface with at least one flow channel thereon for distributing the supply containing hydrogen to a first side of the anode electrode from an anode inlet;
a second member having a surface with at least one flow channel thereon for collecting a supply of purified hydrogen separated from the supply containing hydrogen from a first side of the cathode electrode;
a proton conducting electrolyte disposed between a second side of the anode electrode and a second side of the cathode electrode; and
wherein at least one of the anode electrode and the cathode electrode comprises a nonporous hydrogen permeable electrode comprising a solid thin metallic film,
wherein the at least one nonporous hydrogen permeable electrode comprising the solid thin metallic film is bonded to at least one of a) the proton conducting electrolyte, and b) a gasket disposed around the proton conducting electrolyte,
wherein the nonporous hydrogen permeable electrode protrudes beyond the gasket in an extending direction thereof;
applying an electrical potential to the anode electrode and the cathode electrode;
transferring protons through the proton conducting electrolyte from the anode electrode to the cathode electrode;
exhausting at least a portion of the supply to the anode inlet; and
collecting hydrogen gas via the second member.

15. The method of claim 14 wherein the at least one nonporous hydrogen permeable electrode is bonded to the proton conducting electrolyte by at least one of vapor deposition and sputtering.

16. The method of claim 14 wherein the proton conducting electrolyte comprises a proton exchange membrane.

17. The method of claim 14 wherein the proton conducting electrolyte is selected from the group comprising perfluorosulfonic acid, polybenzimidazole, perovskite ceramics, and cesium dihydrogen phosphate.

18. The method of claim 14 wherein the anode electrode comprises the nonporous hydrogen permeable electrode comprising the solid thin metallic film.

19. The method of claim 14 wherein the cathode electrode comprises the nonporous hydrogen permeable electrode comprising the solid thin metallic film.

20. The method of claim 14 wherein the anode electrode and the cathode electrode comprise nonporous hydrogen permeable electrodes comprising solid thin metallic film.

21. The method of claim 14 wherein the solid thin film comprises palladium.

22. The method of claim 14 wherein the providing the supply containing hydrogen comprises a mixture of gas having hydrogen.

23. The method of claim 14 wherein the providing the supply containing hydrogen comprises providing a supply of water.

24. The method of claim 14 further comprising applying backpressure to the cathode outlet.

25. The method of claim 14 wherein the device comprises a stack.

26. A method for forming a hydrogen pump, the method comprising:
providing a proton conducting electrolyte;
positioning the proton conducting electrolyte between a second side of an anode electrode and a second side of a cathode electrode, at least one of the anode electrode and the cathode electrode comprising a nonporous hydrogen permeable electrode comprising a solid thin metallic film;
disposing a first side of the anode electrode and a first side of the cathode electrode between a first member having a surface with at least one flow channel thereon for distributing a supply containing hydrogen to the first side of the anode electrode from an anode inlet, and a second member having a surface with at least one flow channel thereon for collecting a supply of purified hydrogen separated from the supply containing hydrogen from the first side of the cathode electrode; and
wherein at least one of the positioning and the disposing comprises bonding the at least one nonporous hydrogen permeable electrode comprising the solid thin metallic film to at least one of a) the proton conducting electrolyte, and b) a gasket disposed around the proton conducting electrolyte,
wherein the nonporous hydrogen permeable electrode protrudes beyond the gasket in an extending direction thereof.

27. The method of claim 26 wherein the bonding comprises bonding the at least one nonporous hydrogen permeable electrode to the proton conducting electrolyte.

28. The method of claim 26 wherein the bonding comprises bonding the at least one nonporous hydrogen permeable electrode to the gasket disposed around the proton conducting electrolyte.

29. The method of claim 26 wherein the bonding comprises bonding the at least one nonporous hydrogen permeable electrode to the proton conducting electrolyte by vapor deposition.

30. A method for forming a hydrogen pump, the method comprising:
providing a solid anhydrous proton conducting electrolyte;
positioning the solid anhydrous proton conducting electrolyte between a second side of an anode electrode and a second side of a cathode electrode, at least one of the anode electrode and the cathode electrode comprising a nonporous hydrogen permeable electrode comprising a solid thin metallic film; and
disposing a first side of the anode electrode and a first side of the cathode electrode between a first member having a surface with at least one flow channel thereon for distributing a supply containing hydrogen to the first side of the anode electrode from an anode inlet, and a second member having a surface with at least one flow channel thereon for collecting a supply of purified hydrogen separated from the supply containing hydrogen from the first side of the cathode electrode; and wherein at least one of the positioning and the disposing comprises bonding the at least one nonporous hydrogen permeable electrode comprising the solid thin metallic film to at least one of a) the proton conducting electrolyte, and b) a gasket disposed around the proton conducting electrolyte, wherein the nonporous hydrogen permeable electrode protrudes beyond the gasket in an extending direction thereof.

31. The method of claim 30 wherein the anode electrode comprises a nonporous hydrogen permeable electrode comprising the solid thin metallic film.

32. The method of claim 30 wherein the cathode electrode comprises a nonporous hydrogen permeable electrode comprising the solid thin metallic film.

33. The method of claim 31 wherein the anode electrode and the cathode electrode comprise nonporous hydrogen permeable electrodes comprising the solid thin metallic film.

* * * * *